(12) United States Patent
Foreman et al.

(10) Patent No.: US 6,652,180 B2
(45) Date of Patent: Nov. 25, 2003

(54) METHOD AND APPARATUS FOR LOAD-BEARING COUPLING

(75) Inventors: Bradley Howard Foreman, Waynesville, OH (US); Keith Richard Kowalczyk, Huber Heights, OH (US)

(73) Assignee: General Electric Co., Schenectady, NY (US)

( * ) Notice: Subject to any disclaimer, the term of this patent is extended or adjusted under 35 U.S.C. 154(b) by 126 days.

(21) Appl. No.: 09/919,054

(22) Filed: Jul. 31, 2001

(65) Prior Publication Data

US 2003/0026648 A1 Feb. 6, 2003

(51) Int. Cl.[7] .............................. F16B 12/36; F16D 1/00
(52) U.S. Cl. ....................... 403/296; 403/315; 403/316; 403/340; 403/348
(58) Field of Search ........................ 403/315, 316, 403/348–349, 340, 353, 345, 350–351; 198/670.1, 682, 685–687

(56) References Cited

U.S. PATENT DOCUMENTS

| | | | | |
|---|---|---|---|---|
| 535,278 A | * | 3/1895 | Downing | 403/348 |
| 805,674 A | * | 11/1905 | Senderling | 24/573.11 |
| 1,403,201 A | * | 1/1922 | Shaw | 403/348 |
| 1,420,639 A | * | 6/1922 | Sturgis | 15/147.2 |
| 3,927,760 A | * | 12/1975 | McCall | 198/687.1 |
| 4,353,203 A | | 10/1982 | Lotoski | |
| 4,986,690 A | * | 1/1991 | Cooksey | 403/319 |
| 5,018,901 A | * | 5/1991 | Ferree et al. | 403/349 |
| 5,286,129 A | | 2/1994 | French et al. | |
| 5,407,293 A | * | 4/1995 | Crainich | 403/322 |
| 5,452,924 A | | 9/1995 | Kujawski | |
| 5,586,792 A | | 12/1996 | Kalahasthy | |
| 5,607,251 A | * | 3/1997 | Rafn | 403/348 |
| 5,626,435 A | * | 5/1997 | Wohlhuter | 403/348 |
| 5,655,692 A | * | 8/1997 | Navin et al. | 222/413 |
| 5,743,670 A | | 4/1998 | Ader | |
| 6,126,359 A | * | 10/2000 | Dittrich | 403/349 |
| 6,151,810 A | * | 11/2000 | Mukai | 37/350 |

* cited by examiner

Primary Examiner—Anthony Knight
Assistant Examiner—Michael J. Kyle
(74) Attorney, Agent, or Firm—Nathan D. Herkamp; Armstrong Teasdale LLP; Robert B. Reeser, III

(57) ABSTRACT

A coupling for coupling a component to a hanger including a first member and a second member. The coupling includes a first member and a second member. The first member includes a pair of extending portions and a pair of extending tabs. The second member includes a pair of circumferential openings and a pair of opposed notches. The openings and notches receive the extending portions and tabs. The component is supportable from the hanger and is substantially restricted from independent movement relative to the hanger when the first member is connected to the second member.

15 Claims, 2 Drawing Sheets

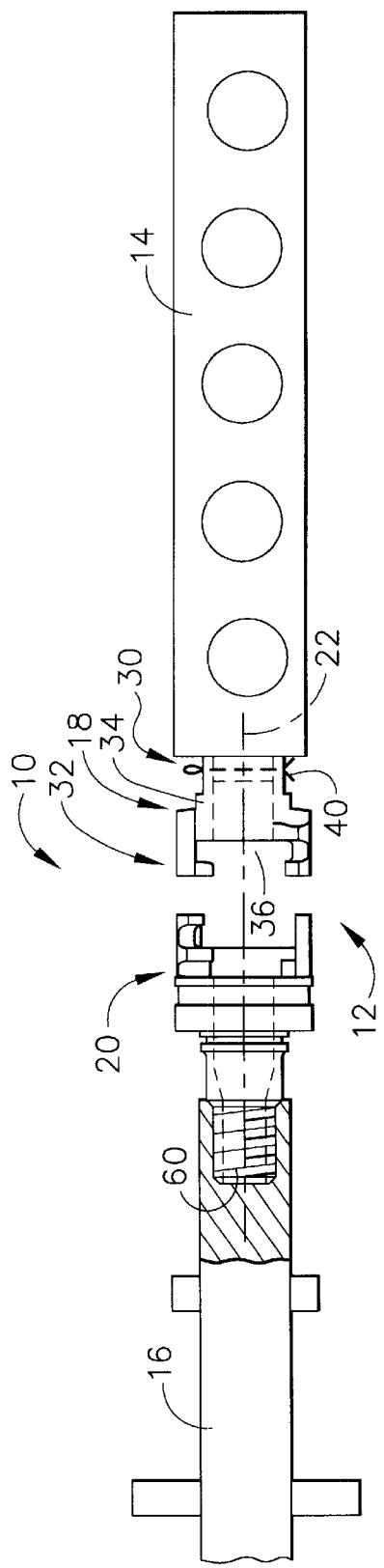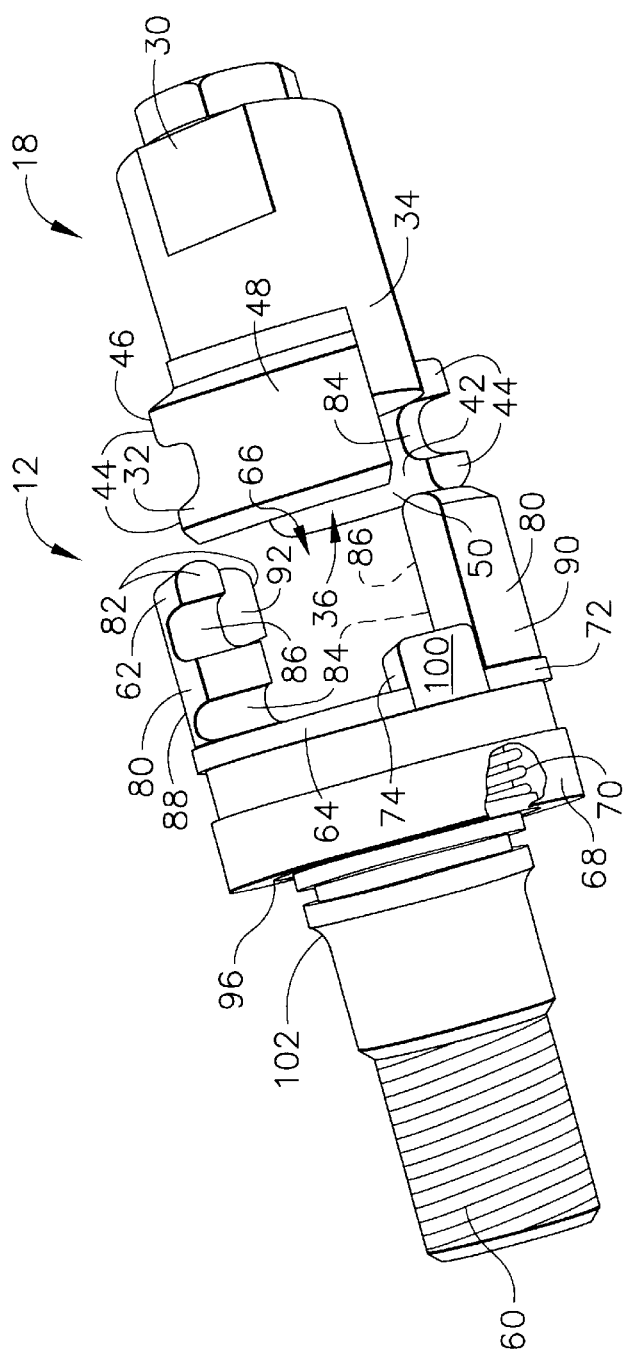

METHOD AND APPARATUS FOR LOAD-BEARING COUPLING

BACKGROUND OF THE INVENTION

This invention relates generally to couplings and, more particularly, to load-bearing quick-disconnect couplings used on an assembly line.

On an assembly line, components undergo various operations. To facilitate at least one operation at a station on the assembly line each component is connected to a mobile hanger. For example, a mobile hanger facilitates lifting and positioning components for coating or dipping. Component orientation is controlled by the hanger during dipping operations so that the component receives a predetermined coating at a desired orientation of the component. The component is then disconnected from the hanger and moved to the next station in the assembly process. Coupling and uncoupling components may be a time-consuming and laborious process.

BRIEF SUMMARY OF THE INVENTION

In one aspect of the present invention, a coupling is provided for removably coupling a component to a hanger. The coupling includes a first cylindrical member and a second cylindrical member. The first cylindrical member includes a first end and a second end. The first end attaches to the component and the second end includes a pair of extending portions including a first pair of opposed tabs. The second cylindrical member includes a first end and a second end. The second member first end attaches to the hanger, and includes a pair of circumferentially opposed sections that define a cavity. The second member first end also includes a pair of circumferential openings and a pair of opposed notches. The cavity is sized to receive the first cylindrical member second end therein, and the pair of circumferential openings are sized to receive the first cylindrical member second end extending portions. The second cylindrical member second end opposed notches are sized to receive the first cylindrical member second end opposed tabs, such that the component is supportable from the hanger. The tabs are configured to prevent independent movement of the component relative to the hanger.

In another aspect, a coupling assembly including a component, a hanger, a first member, and a second member is provided. The first member includes a first end, a second end, and a body. The first member first end attaches to the component, and the second end includes a pair of extending portions including a first pair of tabs. The second member includes a first end, a second end, and a body. The second member first end attaches to the hanger, and the second member second end includes a pair of circumferentially opposed sections that define a cavity, a pair of circumferential openings, and a first pair of opposed notches. The cavity is sized to receive the first member body, and the pair of circumferential openings are sized to receive the first member pair of extending portions. The pair of opposed notches are sized to receive the pair of opposed tabs such that a gap is defined between the first member body and the second member body. The tabs are configured to prevent rotation of the component independent of the hanger.

BRIEF DESCRIPTION OF THE DRAWINGS

FIG. 1 is a cross-sectional view of a coupling assembly;

FIG. 2 is an enlarged perspective view of a coupling shown in FIG. 1; and

DETAILED DESCRIPTION OF THE INVENTION

Figure 3:
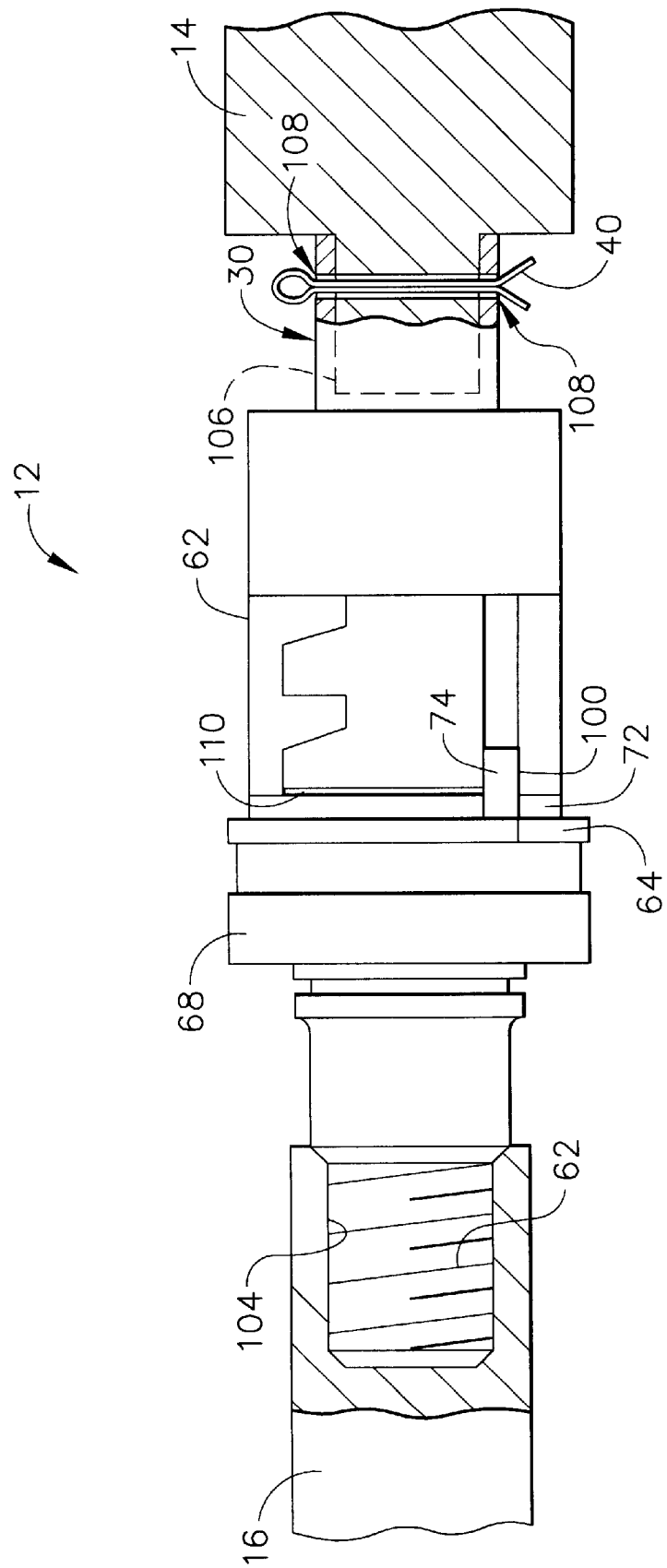
FIG. 3 is an enlarged cross-sectional view of the coupling assembly of FIG. 1 with the coupling connected.

FIG. 1 is a cross-sectional view of coupling assembly 10 including a coupling 12 for coupling a component 14 and a hanger 16. FIG. 2 is an enlarged perspective view of coupling 12. In one embodiment, coupling assembly 10 is used to facilitate dip coating of component 14 during assembly line operations. Coupling 12 includes a first member 18 and a second member 20. An axis of symmetry 22 extends through first member 18 and second member 20. In one embodiment, coupling 12 is substantially similar to a National Series A Coupling, commercially available from Perfecting Coupling Company, Charlotte, N.C.

First member 18 includes a first end 30, a second end 32, and a body 34 extending therebetween. Body 34 defines a central cavity 36. In the exemplary embodiment, body 34 is hollow and is substantially cylindrical. In an alternative embodiment, body 34 is substantially solid between first and second ends 30 and 32. In a further embodiment, body 34 is non-cylindrical. In another embodiment, first member 18 is metallic and is fabricated from stainless steel. In a further embodiment, first member 18 is fabricated from other suitable materials, including, but not limited to, brass or zinc plated steel.

First member first end 30 is attached to component 14. In the exemplary embodiment, first end 30 is hollow and secured to component 14 by a pin 40. In another embodiment, a fastener (not shown) is used to secure first end 30 to component 14. In a further embodiment, first end 30 is threadedly secured (not shown) to component 14. In yet another embodiment, body 34 is substantially solid through only one of first end 30 and second end 32.

First member second end 32 includes a pair of circumferentially opposed portions 42 that extend axially from first member body 34. In the exemplary embodiment, each opposed portion 42 includes two pair of circumferential tabs 44. In another embodiment, each opposed portion 42 includes only one pair of circumferential tabs 44. Second end 32 has an outer diameter 46 measured with respect to an outer surface 48 of first member 18. First member 18 also includes an inner surface 50 that defines center cavity 36 within first member second end 32.

Second member 20 includes a first end 60, a second end 62, a body 64, a central cavity 66, a collar 68 and a spring 70. In the exemplary embodiment, body 64 is hollow and substantially cylindrical. Body 64 includes an outer surface 72 and a channel 74 in outer surface 72. In an alternative embodiment, second member second body 64 is solid and is non-cylindrical. In another embodiment, second member 20 is metallic and is fabricated from stainless steel. In further embodiments, second member 20 is fabricated from other suitable materials such as, but not limited to, brass or zinc plated steel.

Second member first end 60 is attached to hanger 16. In the exemplary embodiment, first end 60 is threadedly secured to hanger 16. In another embodiment, a fastener (not shown) is used to secure second member first end 60 to hanger 16.

Second member second end 62 includes a pair of circumferentially opposed sections 80 that extend from second member body 64. Second member central cavity 66 is formed radially between opposed sections 80 and opposed sections 80 also define a pair of circumferential openings 82.

Openings 82 are sized to receive first member portions 42. In the exemplary embodiment, circumferentially opposed sections 80 define a first pair of opposed notches 84, and a second pair of opposed notches 86. Opposed notches 84 and 86 extend circumferentially from openings 82 within opposed sections 80. In another embodiment, opposed sections 80 define only one pair of opposed notches 84. Second member second end 62 has an outer diameter 88 measured with respect to an outer surface 90 that extends over second member 20. Second member 20 also includes an inner surface 92 that defines center cavity 66 within second end 62.

Collar 68 extends circumferentially around second member body 64. Collar 68 has an inner diameter 96 that is slightly larger than second member outer diameter 88, such that collar 68 may slide axially about second member body 64. Collar 68 also includes a pair of protrusions 100 that extend axially and radially into openings 82 and second member body channel 74. Spring 70 biases collar 68 toward second member second end 62, such that protrusions 100 extend into openings 82.

In the exemplary embodiment, second member outer diameter 88 is approximately equal to first member outer diameter 46. Thus, second member outer surface 90 is substantially flush with first member outer surface 48 when first member 18 is connected to second member 20.

FIG. 3 is an enlarged cross-sectional view of coupling assembly 10 with coupling 12 connected. Hanger 16 includes a threaded socket 104 sized to receive second member first end 62. In another embodiment, second member first end 62 is secured to hanger 16 using fasteners, as is known in the art. In a further embodiment, hanger 16 is used with a dip coating mechanism (not shown).

Component 14 includes a mounting ring 106 that is sized to receive first member first end 30. Mounting ring 106 includes two apertures 108 that secure first member 30 to mounting ring 106 with pin 40.

In operation, second member first end 60 is coupled to hanger 16. First member first end 30 is fastened to component 14 using pin 40. First member 18 is then coupled to second member 20 by sliding and twisting first member 18 into second member 20. More specifically, when first member 18 is coupled to second member 10, first member portions 42 are received in second member openings 82, and collar 68 is forced axially against spring pressure axially towards second member first end 60. First member 18 is then rotated such that first member tabs 44 are received in opposed notches 84 and 86. When tabs 44 are received in opposed notches 84 and 86 spring 70 slides collar 68 axially towards second member second end 62, which positions protrusions 100 circumferentially adjacent first member portions 42. Protrusions 100 circumferentially contact portions 42 to prevent inadvertent removal of tabs 44 from notches 84 and 86. Although first member body 34 is received in second member central cavity 66, first member body 34 does not completely fill second member central cavity 66. Accordingly, a gap 110 exists between first member body 34 and second member body 64.

With first member 18 connected to second member 20, hanger 16 is moved and rotated as necessary to position component 14. For example, during an assembly line process, hanger 16 is a movable portion of a dip coating mechanism. Hanger 16 lifts and supports component 14 during the coating process. Coupling assembly 10 allows component 14 to be positively positioned and controllably rotated in the dip bath.

In one embodiment, coupling assembly 10 supports components weighing at least 25 pounds. Movement or rotation of hanger 16 results in essentially identical movement or rotation of component 14. Accordingly, such positional control facilitates dipping of relatively long narrow components in long narrow tanks. Furthermore, connection of first member 18 to second member 20 is completed manually, in that no tools are used. Similarly, no tools are needed to uncouple first member 18 from second member 20. As such, first member 18 may be coupled to second member 20 in about five seconds under normal conditions. Such speed of connecting and lack of need for tools or peripheral equipment facilitates efficient operation.

The above-described coupling assembly is cost-effective and highly reliable. The coupling includes a first member and a second member that facilitate a load-bearing connection of a hanger and a component. Furthermore, because tools are not required to connect each member, assembly of the coupling assembly is simplified in comparison to known coupling assemblies. Thus, a coupling is provided which is cost-effective and highly reliable.

While the invention has been described in terms of various specific embodiments, those skilled in the art will recognize that the invention can be practiced with modification within the spirit and scope of the claims.

What is claimed is:

1. A coupling for removably coupling a component to a hanger, said coupling comprising:

a first cylindrical member comprising a first end and a second end, said first end attached to the component and said second end comprising a pair of axially extending portions defining a first cavity therebetween, said portions comprising a first pair of opposed tabs; and a second cylindrical member comprising a first end and a second end, said first end attached to the hanger, said second end comprising a pair of circumferentially opposed axially extending sections defining a second cavity therebetween, a pair of circumferential openings, and a pair of opposed notches, said second cavity sized to receive said first cylindrical member second end, said pair of circumferential openings sized to receive said first cylindrical member second end extending portions, said second cylindrical member second end opposed notches sized to receive said first cylindrical member second end opposed tabs, such that the component is supportable from the hanger, said tabs configured to prevent independent movement of the component relative to the hanger.

2. A coupling in accordance with claim 1 wherein said first member second end further comprises a second pair of opposed tabs, said second member second end further comprises a second pair of opposed notches sized to receive said first member second pair of opposed tabs.

3. A coupling in accordance with claim 1 wherein said first member first end and said second member first end are substantially solid.

4. A coupling in accordance with claim 1 wherein said first cylindrical member comprises a body and said second cylindrical member comprises a body, said first member body and said second member body separated by a gap when said extending portions are received in said circumferential openings.

5. A coupling in accordance with claim 1 wherein said first member first end attached to the component by a fastener.

6. A coupling in accordance with claim 1 wherein said coupling supports at least approximately 25 pounds.

7. A coupling in accordance with claim 1 wherein said first member configured to be connected to said second member without using any tools.

8. A coupling in accordance with claim 1 wherein said second member further comprises a collar and a spring, said collar configured to maintain said first member in contact with said second member.

9. A coupling in accordance with claim 8 wherein said collar comprises a pair of protrusions, said collar biased by said spring to contact said first member extending portions such that said opposed tabs are retained within said opposed notches.

10. A coupling assembly comprising:

a component;

a hanger;

a first member comprising a first end, a second end, and a body, said first end attached to said component, said second end comprising a pair of axially extending portions defining a first cavity therebetween, said portions comprising a first pair of opposed tabs; and a second member comprising a first end, a second end, and a body, said second member first end attached to said hanger, said second member second end comprising a pair of circumferentially opposed axially extending sections defining a second cavity therebetween, a pair of circumferential openings, and a first pair of opposed notches, said second cavity sized to receive said first member body, said pair of circumferential openings sized to receive said first member pair of extending portions, said pair of opposed notches sized to receive said pair of opposed tabs such that a gap is defined between said first member body and said second member body, said tabs configured to prevent rotation of said component independent of said hanger.

11. A coupling assembly in accordance with claim 10 said second member comprising a collar and a spring, said collar comprising a pair of protrusions, said collar biased by said spring to abut said first member extending portions such that said first pair of opposed tabs are retained in said opposed notches.

12. A coupling assembly in accordance with claim 10 wherein said first member configured to be attached to said second member without using tools.

13. A coupling assembly in accordance with claim 10 wherein said first member first end and said second member first end are substantially solid.

14. A coupling assembly in accordance with claim 10 said first member extending portions further comprising a second pair of opposed tabs, said second member opposed sections defining a second pair of opposed notches, said first and second pair of opposed notches sized to receive said first and second pair of opposed tabs such that a gap is defined between said first member body and said second member body.

15. A coupling assembly in accordance with claim 10 wherein said coupling supports at least approximately 25 pounds.

\* \* \* \* \*